US011922894B2

(12) United States Patent
Zhang

(10) Patent No.: US 11,922,894 B2
(45) Date of Patent: Mar. 5, 2024

(54) DRIVING METHOD OF DISPLAY APPARATUS, APPARATUS, ELECTRONIC DEVICE AND STORAGE MEDIUM FOR CORRECTING BRIGHTNESS DATA USING PIXEL MISALIGNMENT INFORMATION

(71) Applicants: Beijing BOE Display Technology Co., Ltd., Beijing (CN); BOE Technology Group Co., Ltd., Beijing (CN)

(72) Inventor: Chunbing Zhang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 37 days.

(21) Appl. No.: 17/475,360

(22) Filed: Sep. 15, 2021

(65) Prior Publication Data

US 2022/0238078 A1 Jul. 28, 2022

(30) Foreign Application Priority Data

Jan. 22, 2021 (CN) ......................... 202110093942.9

(51) Int. Cl.
*G09G 3/36* (2006.01)

(52) U.S. Cl.
CPC ....... *G09G 3/36* (2013.01); *G09G 2310/0243* (2013.01); *G09G 2310/0264* (2013.01); *G09G 2320/0233* (2013.01)

(58) Field of Classification Search
CPC ...... G09G 3/2074; G09G 3/36; G09G 3/3607; G09G 3/34-3426; G09G 3/3648;
(Continued)

(56) References Cited

U.S. PATENT DOCUMENTS

2009/0027598 A1* 1/2009 Ikeno .................. G02F 1/13471
349/77
2017/0068315 A1 3/2017 Kang et al.
(Continued)

FOREIGN PATENT DOCUMENTS

CN 106154682 A 11/2016
CN 106504271 A 3/2017
(Continued)

OTHER PUBLICATIONS

Office Action dated Mar. 25, 2022 for Chinese Patent Application No. 202110093942.9 and English Translation.

*Primary Examiner* — Keith L Crawley
(74) *Attorney, Agent, or Firm* — Ling Wu; Stephen Yang; Ling and Yang Intellectual Property

(57) ABSTRACT

Provided are a driving method of a display apparatus, a driving apparatus, an electronic device and a storage medium. The display apparatus includes a first display panel and a second display panel disposed on a light-emitting side of the first display panel, wherein the first display panel is divided into a plurality of pixel blocks; and the driving method includes: acquiring an angle between a user's eye and each pixel block and initial brightness data corresponding to the first display panel; determining misalignment information corresponding to each pixel block according to the angle between the user's eye and each pixel block; correcting the initial brightness data according to the misalignment information corresponding to each pixel block to obtain corrected brightness data; and outputting the corrected brightness data to the first display panel.

16 Claims, 9 Drawing Sheets

(58) Field of Classification Search
CPC ..... G09G 2300/023; G09G 2310/0243; G09G 2310/0264; G09G 2320/0233; G09G 2320/0257–0266; G09G 2320/028–0285; G09G 2320/0626; G09G 2320/0646; G09G 2320/066; G09G 2320/068; G09G 2340/04; G09G 2340/0464–0492; G09G 2340/12; G09G 2356/00; G09G 2380/08; G02F 1/1323; G02F 1/1347; G02F 1/13471; G06F 3/011–013; G02B 27/0093; G02B 27/0179; G02B 2027/0123; G02B 2027/0181–0187; G02B 2027/0198
See application file for complete search history.

(56) References Cited

U.S. PATENT DOCUMENTS

| | | | | |
|---|---|---|---|---|
| 2018/0356703 | A1 | 12/2018 | Wang et al. | |
| 2019/0279581 | A1 | 9/2019 | Furuta et al. | |
| 2019/0304381 | A1* | 10/2019 | Hirotsune | G09G 3/3607 |
| 2020/0118502 | A1 | 4/2020 | Hirotsune et al. | |
| 2021/0385430 | A1* | 12/2021 | Kusafuka | H04N 13/31 |
| 2022/0101767 | A1 | 3/2022 | Wu | |
| 2022/0155638 | A1* | 5/2022 | Weindorf | G09G 3/3426 |
| 2022/0157265 | A1* | 5/2022 | Lee | G09G 3/003 |

FOREIGN PATENT DOCUMENTS

| | | | |
|---|---|---|---|
| CN | 107515474 | A | 12/2017 |
| CN | 112130736 | A | 12/2020 |

* cited by examiner

DRIVING METHOD OF DISPLAY APPARATUS, APPARATUS, ELECTRONIC DEVICE AND STORAGE MEDIUM FOR CORRECTING BRIGHTNESS DATA USING PIXEL MISALIGNMENT INFORMATION

CROSS-REFERENCE TO RELATED APPLICATION

The present application claims the priority of Chinese Patent Application No. 202110093942.9 filed to the CNIPA on Jan. 22, 2021, the content of which is incorporated herein by reference.

TECHNICAL FIELD

Embodiments of the present disclosure relate to, but are not limited to, the field of display technology, in particular to a driving method of a display apparatus, apparatus, electronic device and storage medium.

BACKGROUND

For a display apparatus including a two-layer display panel with bonding structure, viewers often observe misalignment of the upper and lower pixels under a certain angle of view, which will cause ghosting problems that affect the visual experience.

SUMMARY

Following is a summary of the subject matter described herein in detail. This summary is not intended to limit the protection scope of the claims.

Embodiments of the present disclosure mainly provide following technical solutions.

In a first aspect, an embodiment of the present disclosure provides a driving method of a display apparatus which includes a first display panel and a second display panel disposed on a light-emitting side of the first display panel, wherein the first display panel is divided into a plurality of pixel blocks;

and the driving method includes: acquiring an angle between a user's eye and each pixel block and initial brightness data corresponding to the first display panel; determining misalignment information corresponding to each pixel block according to the angle between the user's eye and each pixel block; correcting the initial brightness data according to the misalignment information corresponding to each pixel block to obtain corrected brightness data; and outputting the corrected brightness data to the first display panel.

In a second aspect, an embodiment of the present disclosure further provides a non-transitory computer-readable storage medium including a stored program, wherein a device in which the non-transitory storage medium is located is controlled to execute a driving method of a display apparatus when the program runs; wherein, the display apparatus includes: a first display panel and a second display panel disposed on a light-emitting side of the first display panel, wherein the first display panel is divided into a plurality of pixel blocks; the driving method includes:

acquiring an angle between a user's eye and each pixel block and initial brightness data corresponding to the first display panel;

determining misalignment information corresponding to each pixel block according to the angle between the user's eye and each pixel block;

correcting the initial brightness data according to the misalignment information corresponding to each pixel block to obtain corrected brightness data; and outputting the corrected brightness data to the first display panel.

In a third aspect, an embodiment of the present disclosure provides a driving apparatus, including: a processor and a memory storing a computer program that is capable of running on the processor, wherein following acts are implemented when the processor executes the computer program:

acquiring an angle between a user's eye and each pixel block and initial brightness data corresponding to the first display panel;

determining misalignment information corresponding to each pixel block according to the angle between the user's eye and each pixel block;

correcting the initial brightness data according to the misalignment information corresponding to each pixel block to obtain corrected brightness data; and outputting the corrected brightness data to the first display panel.

In a fourth aspect, an embodiment of the present disclosure provides an electronic device, including a display apparatus and the above-mentioned driving apparatus; wherein, the display apparatus includes: a first display panel and a second display panel disposed on a light-emitting side of the first display panel, wherein the first display panel is divided into a plurality of pixel blocks.

Other features and advantages of the present disclosure will be described in the subsequent description, and, in part, become apparent from the description, or can be understood by implementing the present disclosure. Other advantages of the present disclosure can be implemented and achieved by the solutions described in the specification and accompanying drawings.

Other aspects may be comprehended upon reading and understanding of the drawings and the detailed descriptions.

BRIEF DESCRIPTION OF DRAWINGS

Accompanying drawings are used to provide a further understanding of technical solutions of the present disclosure, form a part of the specification, and explain technical solutions of the present disclosure together with embodiments of the present disclosure, while they do not constitute a limitation on the technical solutions of the present disclosure. The shape and size of each component in the drawings do not reflect true proportions and only to be used to schematically illustrate contents of the present disclosure.

DETAILED DESCRIPTION

Figure 1:
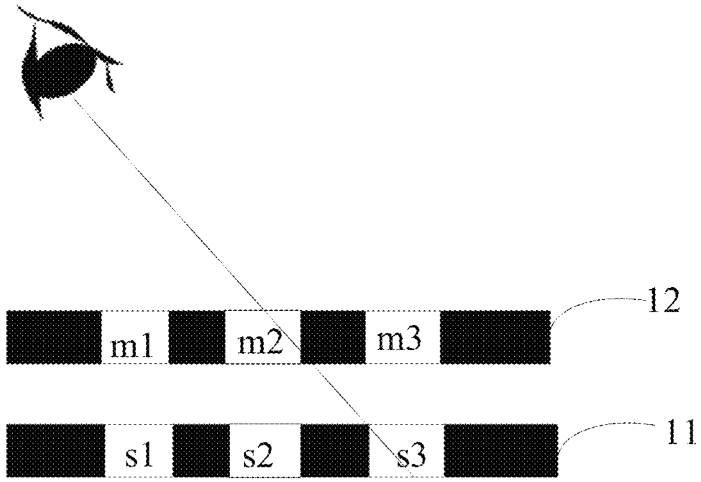
FIG. 1 is a schematic diagram of a structure of a display apparatus according to an embodiment of the present disclosure.

Specific implementations of the present disclosure will be described further in detail below with reference to the accompanying drawings and embodiments. A plurality of embodiments is described in the present disclosure, but the description is exemplary rather than restrictive, and there may be more embodiments and implementation solutions within the scope of the embodiments described in the present disclosure. Although many possible feature combinations are shown in the drawings and discussed in specific implementations, the disclosed features may also be combined in many other manners. Unless specifically restricted, any feature or element of any embodiment may be combined with any other feature or element in any other embodiment for use, or may take the place of any other feature or element in any other embodiment.

When describing representative embodiments, the specification may have presented methods and/or processes as a specific order of acts. However, to the extent that the method or process does not depend on a particular order of acts described herein, the method or process should not be limited to the particular order of acts described. As will be appreciated by those of ordinary skill in the art, other orders of acts are possible. Therefore, the particular order of acts set forth in the specification should not be construed as limitations on the claims. Moreover, the claims directed to the methods and/or processes should not be limited to performing their acts in the described order, and those skilled in the art will readily appreciate that these orders may be varied and still remain within the essence and scope of the embodiments of the present disclosure.

Unless otherwise defined, technical terms or scientific terms used in the embodiments of the present disclosure shall have common meanings as construed by those of ordinary skills in the art to which the present disclosure pertains. The terms “first”, “second”, and the like used in the embodiments of the present disclosure do not denote any order, quantity, or importance, but are merely used to distinguish different components. The word “include” or “contain”, etc. means that an element or article that precedes the word is inclusive of the element or article listed after the word and equivalents thereof, but does not exclude other elements or articles. The terms “connection” or “connected”, etc. are not limited to physical or mechanical connections, but may include electrical connections, whether direct or indirect.

FIG. 1 is a schematic diagram of a structure of a display apparatus according to an embodiment of the present disclosure. As shown in FIG. 1, the display apparatus is a two-layer display panel with bonding structure, which may include a first display panel 11 and a second display panel 12, wherein the second display panel 12 is disposed on the light-emitting side of the first display panel 11. The second display panel 12 may also be referred to as a main cell, and the first display panel 11 may also be referred to as a sub cell.

Figure 2:
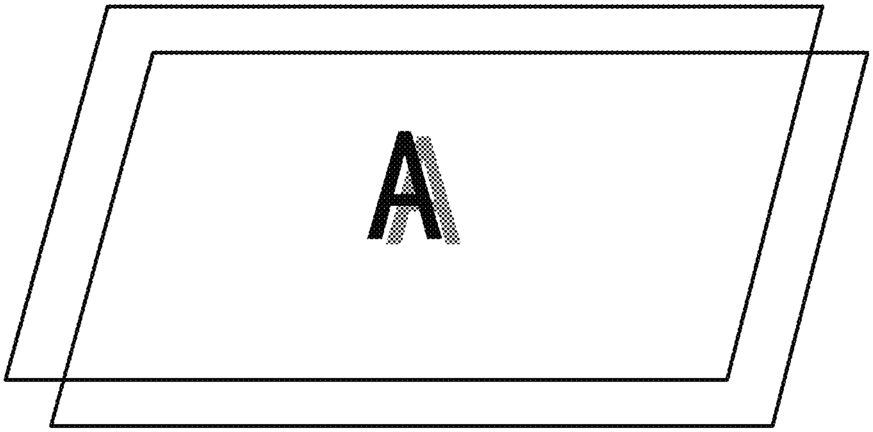
FIG. 2 is a schematic diagram of a display effect of the display apparatus shown in FIG. 1 in some technologies.

A dual cell display apparatus requires two-layers display panels to be fully bonded. However, a gap layer with a thickness of 1 mm to 1.3 mm often exists between two-layer display panels. Therefore, a viewer often observes a problem of misalignment between the upper and lower pixels under a certain angle of view. For example, in an ideal alignment state as shown in FIG. 1, a pixel s1 in the first display panel 11 may correspond to a pixel m1 in the second display panel 12, a pixel s2 in the first display panel 11 may correspond to a pixel m2 in the second display panel 12, and a pixel s3 in the first display panel 11 may correspond to a pixel m3 in the second display panel 12. However, under the certain angle of view as shown in FIG. 1, the viewer often observes that, due to the gap layer between the two display panels, the pixels s1 to s3 in the first display panel 11 do not actually correspond to the pixels m1 to m3 in the second display panel 12. For example, the pixel s3 in the first display panel 11 actually corresponds to the pixel m2 in the second display panel 12. In this way, when the display apparatus displays an image, and when there is a certain angle between a user’s eye and the display panel (determined by a distance between the user’s eye and the display panel), the contents displayed by the upper and lower pixels will not coincide, which causes the display apparatus to have ghosting problems (e.g., the user may observe that the display content displayed by the display apparatus has ghosting as shown in FIG. 2). This deteriorates the display effect and the user’s visual experience. In addition, due to the limitation of the physical alignment accuracy of the two-layer display panels, the product defective rate can often reach more than 60% in the process of full bonding, which will aggravate the problem of misalignment of upper and lower pixels.

An embodiment of the present disclosure provides a driving method, which may be applied to a driving apparatus which is connected with the above display apparatus and may be used for driving the display apparatus to display. In an exemplary embodiment, the first display panel in the display apparatus may be divided into a plurality of pixel blocks. Corrections are made on the initial brightness data corresponding to each pixel block, and the misalignment information corresponding to different pixel blocks is determined according to the angle between the user’s eye and the different pixel blocks. Then, outputting the corrected brightness data to the first display panel can improve the pixel misalignment problem, thereby improving the ghosting problem, as well as the display effect to enhance the user’s visual experience.

In an exemplary embodiment, the display apparatus may be a display, and the driving apparatus may be a host. Of course, embodiments of the present disclosure are not limited to this, and may be others. For example, the above display apparatus may be a display of a television, and the driving apparatus may be a processor of the television. The embodiments of the present disclosure are not limited here.

Below the driving method according to the embodiment of the present disclosure will be described with reference to the above display apparatus.

Figure 3:
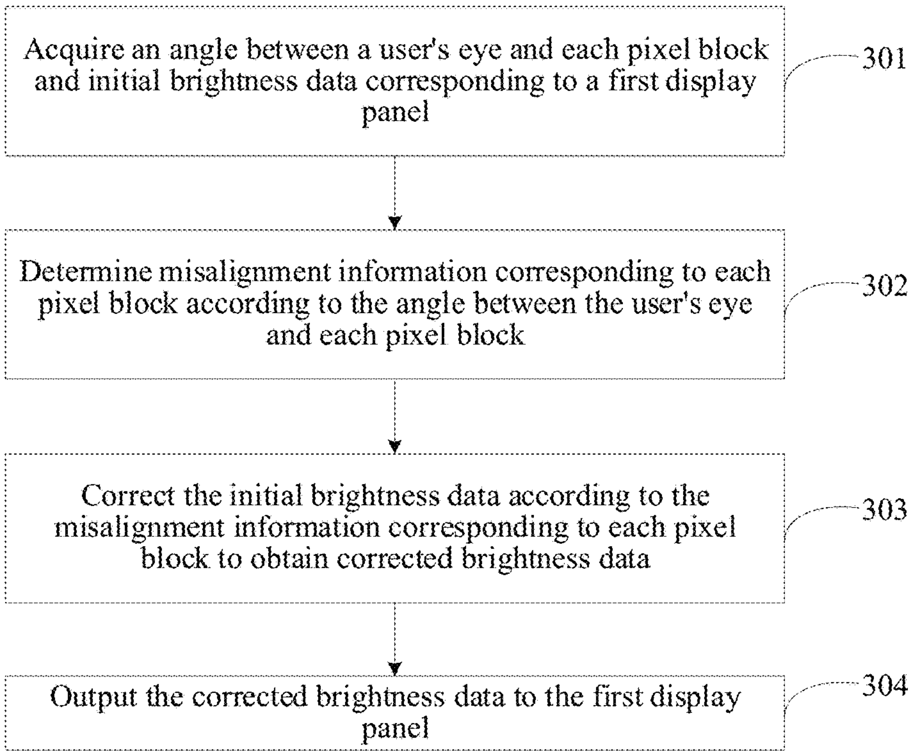
FIG. 3 is a schematic flowchart of a driving method of a display apparatus according to an embodiment of the present disclosure.

FIG. 3 is a schematic flowchart of a driving method of a display apparatus according to an embodiment of the present disclosure. As shown in FIG. 3, the driving method may include the following acts 301-304.

In act 301, an angle between a user's eye and each pixel block and initial brightness data corresponding to the first display panel are acquired.

In an exemplary embodiment, the initial brightness data corresponding to the first display panel may refer to the brightness data of the first display panel corresponding to a display image of the second display panel in an ideal state. The initial brightness data may include an initial sub-brightness value corresponding to each pixel in the first display panel.

In act 302, misalignment information corresponding to each pixel block is determined according to the angle between the user's eye and each pixel block.

In an exemplary embodiment, the misalignment information corresponding to each pixel block may refer to a misalignment distance of the pixel block in the first display panel under the angle between the user's eye and the pixel block (i.e., under an angle of view corresponding to a position of the user's eye). The misalignment information is a variable, which varies according to the different positions of pixel blocks on the display panel and the different angles between the user's eye and each pixel block.

In act 303, the initial brightness data is corrected according to the misalignment information corresponding to each pixel block to obtain corrected brightness data.

In act 304, the corrected brightness data is output to the first display panel.

In this way, the initial brightness data corresponding to different pixel blocks are independently corrected according to the misalignment information corresponding to different pixel blocks which is determined according to the angles between the user's eye and different pixel blocks, the corrected brightness data can improve the pixel misalignment, thereby improving the ghosting problem, as well as the display effect to enhance the user's visual experience.

In an exemplary embodiment, act 301 may include the following acts 3011 to 3012.

In act 3011, a distance between the user's eye and the first display panel and a distance between the user's eye and each pixel block are acquired.

In act 3012, the angle between the user's eye and each pixel block is determined according to the distance between the user's eye and the first display panel and the distance between the user's eye and each pixel block.

In an exemplary embodiment, the distance between the user's eye and the first display panel may refer to a minimum length from the user's eye to pixels in the first display panel.

In an exemplary embodiment, the distance between the user's eye and each pixel block may refer to a minimum length from the user's eye to the pixels in each pixel block.

In an exemplary embodiment, in order to improve the calculation speed, act 3011 may include the following acts 3011*a*~to 3011*c*.

In act 3011*a*, three-dimensional coordinate information of the user's eye is acquired; In act 3011*b*, a distance between the user's eye and a center point of the first display panel is calculated as the distance between the user's eye and the first display panel according to the three-dimensional coordinate information of the user's eye and three-dimensional coordinate information of the center point of the first display panel.

In act 3011*c*, a distance between the user's eye and a center point of each pixel block is calculated as the distance between the user's eye and each pixel block according to the three-dimensional coordinate information of the user's eye and three-dimensional coordinate information of the center point of each pixel block.

In an exemplary implementation, the three-dimensional coordinate information of the user eyes refers to coordinate information of the user eyes relative to the display panel in a space.

For example, an image sensor (e.g., a binocular camera) may be used to obtain the three-dimensional coordinate information of the user's eyes in space through eye tracking technology. For example, a first image and a second image of user's eyes are obtained by shooting images with binocular cameras. Then, with binocular vision technology, according to a pixel position of the user's eyes in the first image and a pixel position of the user's eyes in the second image, the pixel position of the user's eyes in the first image is converted into a first spherical coordinate system position of the user's eyes, and the pixel position of the user's eyes in the second image is converted into a second spherical coordinate system position of the user's eyes by a principle of one-to-one correspondence between pixel positions and spherical coordinate axes in the images shot with binocular cameras. Finally, the spherical coordinate positions of the user's eyes are converted into the three-dimensional coordinates of a three-dimensional space by combining the position information of the binocular camera. In this way, three-dimensional coordinate information of the user's eyes is obtained.

In an exemplary embodiment, act 3012 may include the following acts 3012*a* to 3012*b*.

In act 3012*a*, a ratio between the distance between the user's eye and the first display panel and the distance between the user's eye and each pixel block is calculated to obtain a cosine value of the angle between the user's eye and each pixel block.

In act 3012*b*, the angle between the user's eye and each pixel block is calculated according to the cosine value of the angle between the user's eye and each pixel block, by using an inverse cosine function.

Figure 4A:
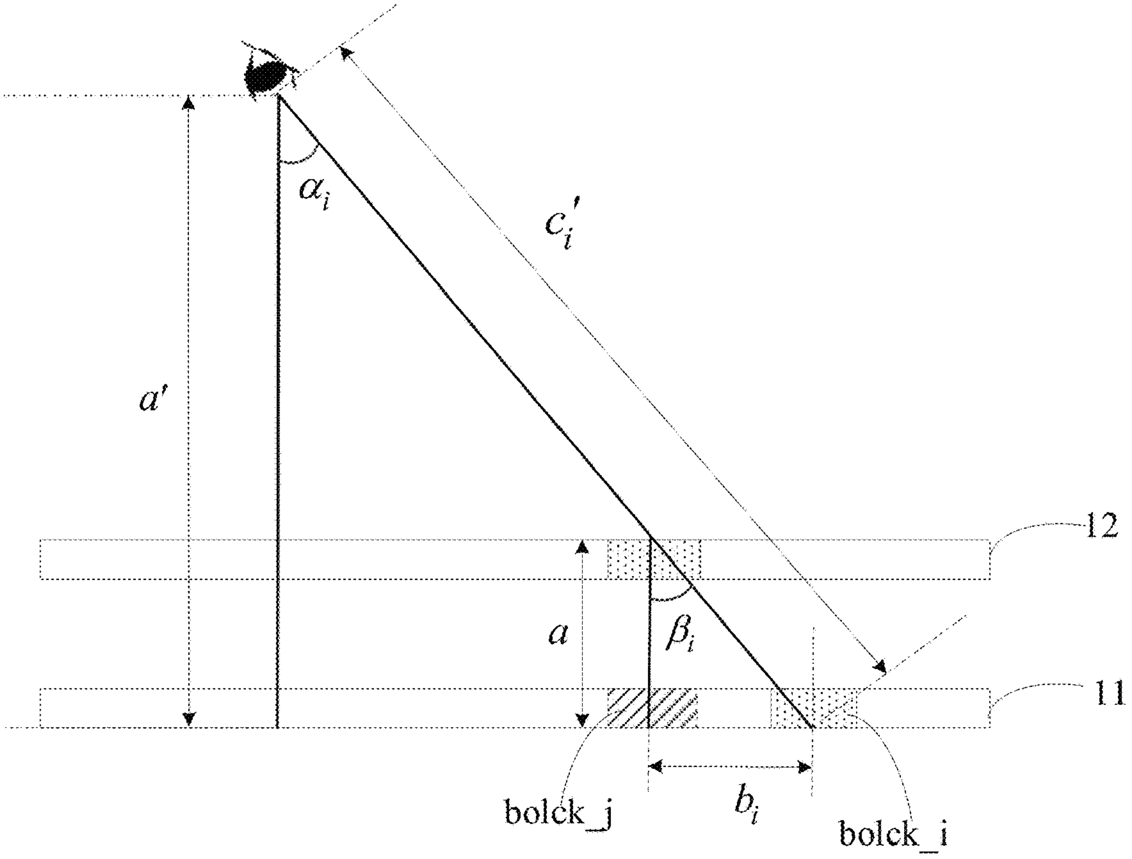
FIG. 4A is a schematic diagram of determining misalignment information corresponding to a pixel block according to an embodiment of the present disclosure.

In an exemplary embodiment, as shown in FIG. 4A, after obtaining the distance between the user's eye and the first display panel and the distance between the user's eye and the center point of each pixel block, the angle between the user's eye and each pixel block may be calculated by formula (1) as follows.

$$\alpha_i = \arccos\left(\frac{a'}{c_i'}\right) \qquad \text{Formula (1)}$$

Where, arccos(·) represents the inverse cosine function, a' represents the distance between the user's eye and the first display panel, $c_i'$ represents a distance between the user's eye and an i-th pixel block, and $\alpha_i$ represents the angle between the user's eye and the i-th pixel block; and i is a positive integer.

In an exemplary embodiment, act 302 may include the following acts 3021 to 3023.

In act 3021, a distance between a first display panel and a second display panel is acquired.

In act 3022, a tangent value of the angle between the user's eye and each pixel block is calculated by using tangent function.

In act 3023, the tangent value of the angle between the user's eye and each pixel block is multiplied by the distance between the first display panel and the second display panel, and the misalignment information corresponding to each pixel block is calculated.

In an exemplary embodiment, as shown in FIG. 4A, Formula (2) may be obtained according to the parallel line corresponding angle relationship. Then, after obtaining the distance between the first display panel and the second display panel and the angle between the user's eye and each pixel block, the misalignment information corresponding to each pixel block may be calculated by the following formulas (2) to (3).

$$\beta_i = \alpha_i \quad \text{Formula (2)}$$

$$b_i = \alpha \times \tan \beta_i \quad \text{Formula (3)}$$

Where, $\alpha$ represents the distance between the first display panel and the second display panel (i.e., the distance between the corresponding upper and lower pixel pairs in the second display panel and the first display panel), tan(·) represents a tangent function, $b_i$ represents misalignment information corresponding to an i-th pixel block bolck_i, and $\alpha_i$ represents an angle between the user's eye and the i-th pixel block bolck_i; and i is a positive integer.

In an exemplary embodiment, act 303 may include: for each pixel block, obtaining the corrected brightness data corresponding to each pixel block according to the misalignment information corresponding to each pixel block, through the following acts 3031 to 3032.

In act 3031, position information of the pixel block is acquired.

In act 3032, target position information corresponding to the pixel block is determined according to the position information of the pixel block and the misalignment information corresponding to the pixel block.

In act 3033, brightness data corresponding to the target position information corresponding to the pixel block in the initial brightness data is acquired as the corrected brightness data corresponding to the pixel block. In this way, the corrected brightness data to be output to the first display panel is obtained after the corrected brightness data corresponding to each pixel block is obtained.

In an exemplary embodiment, according to the difference in relative positions between the user's eye and the pixel block, act 3032 may include: adding the misalignment information corresponding to the pixel block to the position information of the pixel block to obtain the target position information corresponding to the pixel block; or, subtracting the misalignment information corresponding to the pixel block from the position information of the pixel block to obtain the target position information corresponding to the pixel block.

Figure 4B:
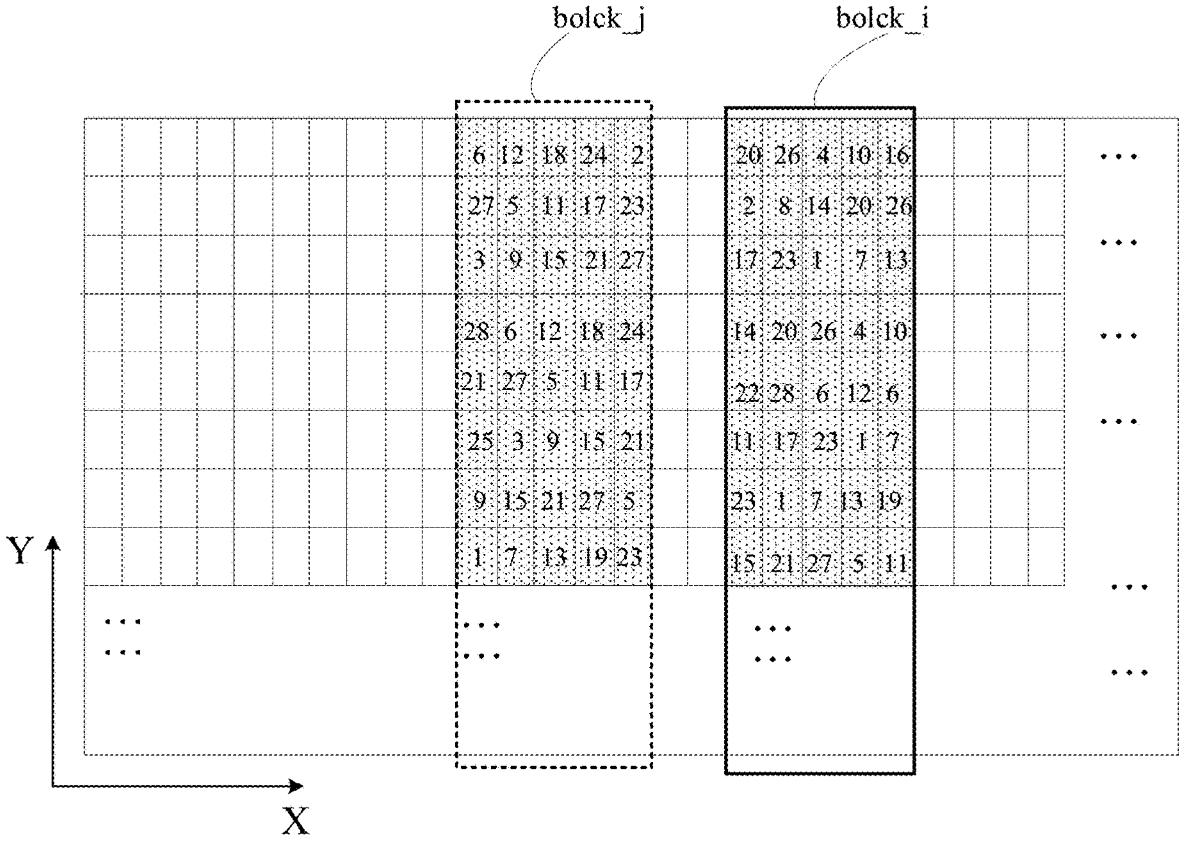
FIG. 4B is a partial schematic diagram of initial brightness data corresponding to a first display panel according to an embodiment of the present disclosure.
Figure 4C:
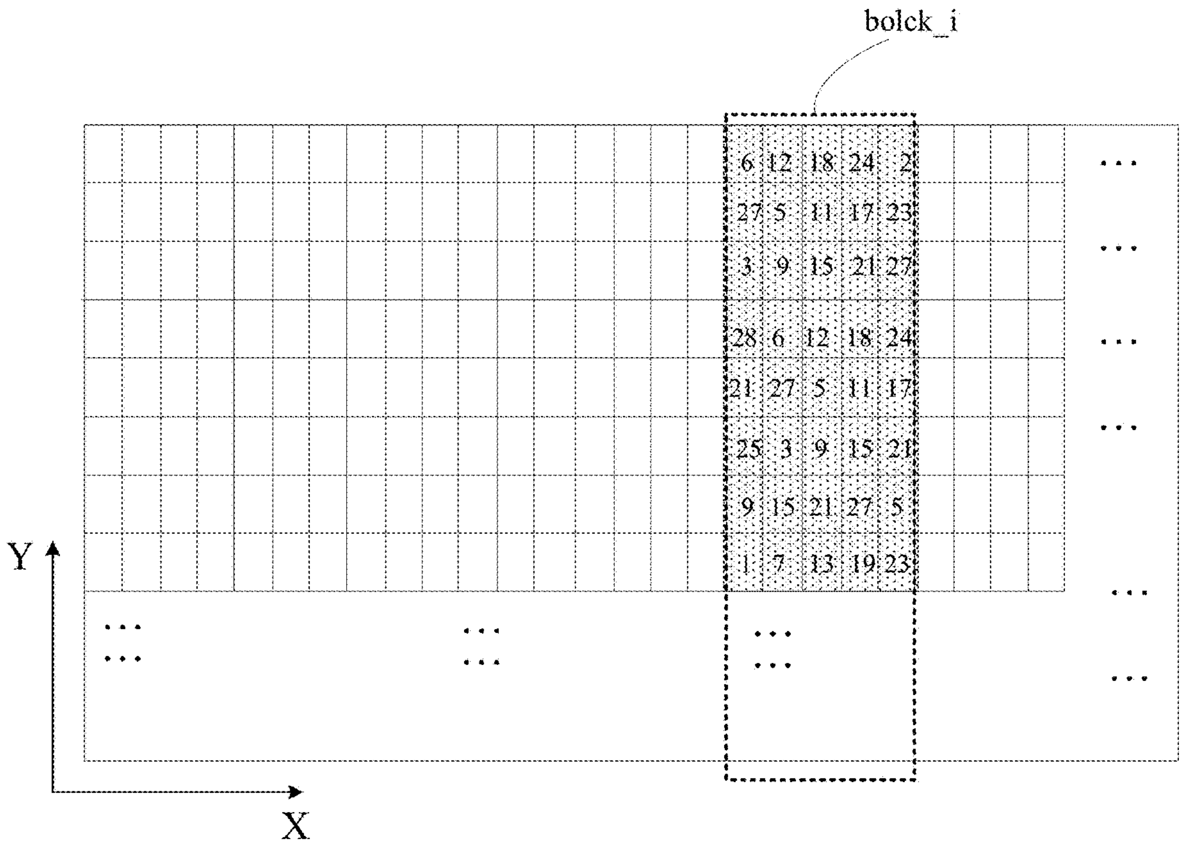
FIG. 4C is a partial schematic diagram of corrected brightness data corresponding to a first display panel according to an embodiment of the present disclosure.

For example, as shown in FIG. 4A, the target position information corresponding to the i-th pixel block bolck_i (i.e., second position information of a j-th pixel block bolck_j in FIG. 4B) may be obtained by obtaining first position information of the i-th pixel block bolck_i and subtracting the misalignment information $b_i$ corresponding to the i-th pixel block bolck_i from the first block information of the i-th pixel block bolck_i. As shown in FIG. 4B, the pixel block bolck_i located at the first position is shown in FIG. 4B with solid lines, and the initial brightness data corresponding to the pixel block bolck_i (the initial sub-brightness data of some pixels in this pixel block is shown by way of example) are also shown. In addition, the pixel block bolck_j located at the second position (i.e., the target position information corresponding to the pixel block bolck_i) is further shown with dashed lines. And the initial brightness data corresponding to the pixel block bolck_j located at the second position (that is, the brightness data corresponding to the target position information corresponding to the pixel block bolck_i in the initial brightness data) are also shown. As shown in FIG. 4C, the dashed lines in FIG. 4C shows that after being corrected by the misalignment information corresponding to the pixel block bolck_i, the brightness data corresponding to the pixel block bolck_j originally located at the second position (that is, the brightness data corresponding to the target position information corresponding to the pixel block bolck_i in the initial brightness data) is displayed in the pixel block bolck_i located at the first position.

In an exemplary embodiment, act 3032 may include the following acts 3032*a* to 3032*c* for each pixel block.

In act 3032*a*, whether the misalignment information corresponding to the pixel block is greater than a preset threshold is determined.

In act 3032*b*, if the misalignment information corresponding to the pixel block is greater than the preset threshold, the target position information corresponding to the pixel block is determined according to the position information of the pixel block and the misalignment information corresponding to the pixel block.

In act 3032*c*, if the misalignment information corresponding to the pixel block is not greater than the preset threshold, the position information of the pixel block is used as the target position information corresponding to the pixel block.

Figure 5:
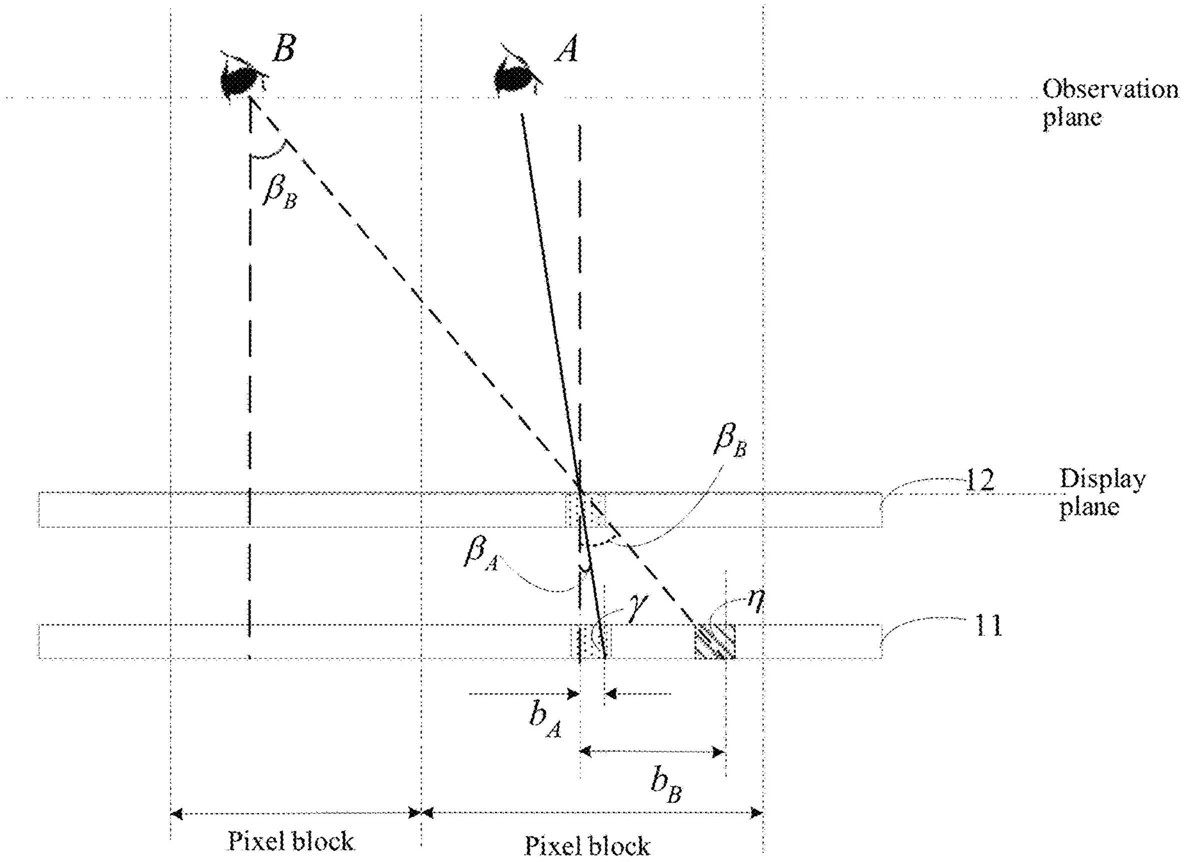
FIG. 5 is a schematic diagram showing a relationship between an observation position and misalignment information according to an embodiment of the present disclosure.

For example, as shown in FIG. 5, it is supposed that the angle $\beta_A$ between the user's eye and the pixel block is small when the observer observes at a point A of an observation plane. In this case, the misalignment information $b_A$ corresponding to the pixel block is not larger than the preset threshold, and the observer's eyes can see that the upper and lower pixels are on a straight line, so that the problems with pixel misalignment do not occur and the observer does not see ghosting. Then, the position information of the pixel block can be used as the target position information corresponding to the pixel block. If the angle $\beta_B$ between the user's eye and the pixel block is large when the observer observes at a point B of the observation plane, in this case, the misalignment information $b_B$ corresponding to the pixel block is larger than the preset threshold, and the observer's eyes can see that the upper and lower pixels are not in a straight line, so that the pixel misalignment problem occurs, and then the observer will see the ghosting. Then, the misalignment information corresponding to the pixel block may be added to the position information of the pixel block to obtain the target position information corresponding to the pixel block.

Therefore, a person skilled in the art can set the preset threshold through experiments to determine whether the position of the pixel block needs to be corrected according to whether the misalignment information corresponding to the pixel block is larger than the preset threshold, and then to further determine whether the initial brightness data corresponding to the pixel block needs to be corrected, thus improving the processing speed and avoiding the waste of computing resources.

In an exemplary embodiment, act 303 may include the following acts 3034 to 3035.

In act 3034, pixel misalignment information corresponding to each pixel block is calculated according to the misalignment information corresponding to each pixel block and size information of a single pixel in the first display panel.

In act 3035, for each pixel block, the corrected brightness data corresponding to each pixel block is obtained according to the pixel misalignment information corresponding to each pixel block, through the following processings: acquiring position information of each pixel in the pixel block; determining sub-target position information corresponding to each pixel in the pixel block according to the position information of each pixel in the pixel block and the pixel misalignment information corresponding to the pixel block; and acquiring a sub-brightness value corresponding to the sub-target position information corresponding to each pixel in the pixel block in the initial brightness data as a corrected sub-brightness value corresponding to each pixel in the pixel block.

In an exemplary embodiment, after obtaining the misalignment information corresponding to each pixel block, the sub-brightness value of each pixel in the pixel block in the initial brightness data may be corrected for each pixel block according to the misalignment information of the pixel block, so that corrected sub-brightness values corresponding to all pixels in the pixel block may be obtained.

According to the following formula (4), the pixel misalignment information corresponding to each pixel block may be calculated according to the misalignment information corresponding to each pixel block and the size information of the single pixel in the first display panel.

$$b_{i\_p} = \frac{b_i}{\text{S\_pixel}} \qquad \text{Formula (4)}$$

Where, $b_i$ represents misalignment information corresponding to the i-th pixel block, S_pixel represents the size information of the single pixel in the first display panel, and $b_{i\_p}$ represents the pixel misalignment information corresponding to each pixel block.

For example, as shown in FIG. 5, when the user's eye is at the position B, a sub-brightness value of a pixel γ located at the first position is obtained as the corrected sub-brightness value corresponding to a pixel η located at the second position, that is, after being corrected by the pixel misalignment information, the pixel η originally located at the second position may display the sub-brightness value of pixel γ originally located at the first position.

In an exemplary embodiment, it is considered that the position of the observer will change, a clock frequency for collecting the angle between the user's eye and each pixel block, a clock frequency for correcting the initial brightness data of the first display panel, and a clock frequency for collecting the three-dimensional coordinate information of the observer's eyes are the same. For example, the clock frequency may be set to be not greater than 60 Hz. For another example, the clock frequency may be set to be 30 Hz.

Of course, in addition to the correction performed in unit of a pixel block, correction performed in unit of a pixel in the pixel block, or the correction performed in other ways as listed above, the embodiments of the present disclosure are not limited here.

It can be seen from the above content that, according to the driving method provided by the embodiments of the present disclosure, the initial brightness data corresponding to different pixel blocks is independently corrected according to the misalignment information corresponding to different pixel blocks which is determined according to the angles between the user's eye and different pixel blocks, and then the corrected brightness data is output to the first display panel, thereby improving the pixel misalignment problem, thus improving the ghosting problem, as well as the display effect to enhance the user's visual experience.

In an exemplary embodiment, the embodiment of the present disclosure further provides a driving apparatus. The driving apparatus may include a processor and a memory storing a computer program that may be run on the processor, the acts of the driving method in the embodiments described above are implemented when the processor executes the program.

Figure 6:
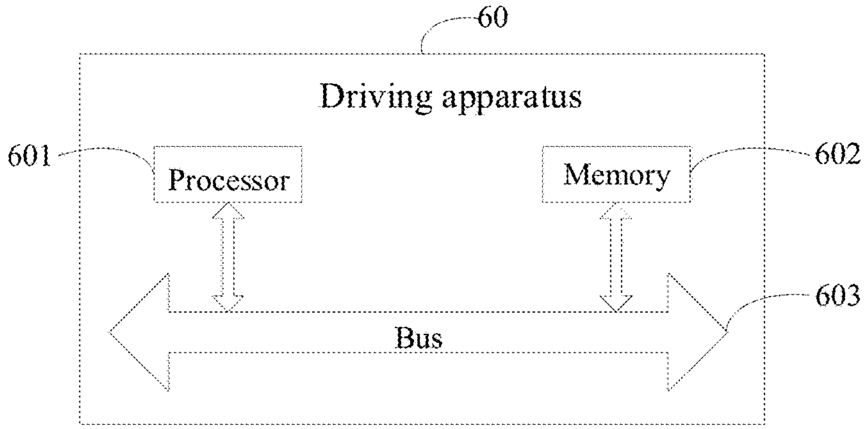
FIG. 6 is a schematic diagram of a structure of a driving apparatus according to an embodiment of the present disclosure.

In an exemplary embodiment, as shown in FIG. 6, the driving apparatus 60 may include at least one processor 601 and at least one memory 602 connected to the processor 601, and a bus 603; wherein the processor 601 and the memory 602 communicate with each other through the bus 603. The processor 601 is configured to call the program instructions in the memory 602 to execute the acts of the driving method in the embodiments described above.

In practice, the above-mentioned processor may be a central processing unit (CPU), other general-purpose processors, a digital signal processor (DSP), a field programmable gate array (FPGA) or other programmable logic devices, a discrete gate or transistor logic device, a discrete hardware component, an application specific integrated circuit, etc. The general-purpose processor may be a microprocessor (MPU) or any conventional processor.

The memory may include a volatile memory, a random access memory (RAM) and/or a nonvolatile memory in computer readable storage media, such as a read only memory (ROM) or flash RAM, and the memory includes at least one memory chip.

Besides a data bus, the bus may further include a power bus, a control bus and a status signal bus, etc. However, for clarity of illustration, various buses are denoted as the bus 603 in FIG. 6.

In an embodiment of the present disclosure, the embodiment of the present disclosure further provides a computer readable storage medium, which includes a stored program, wherein a device where the storage medium is located is controlled to execute acts of the driving method in the embodiments described above when the program is run.

In practice, the computer readable storage medium described above may be, for example, a ROM/RAM, magnetic disk, optical disk, etc.

Figure 7:
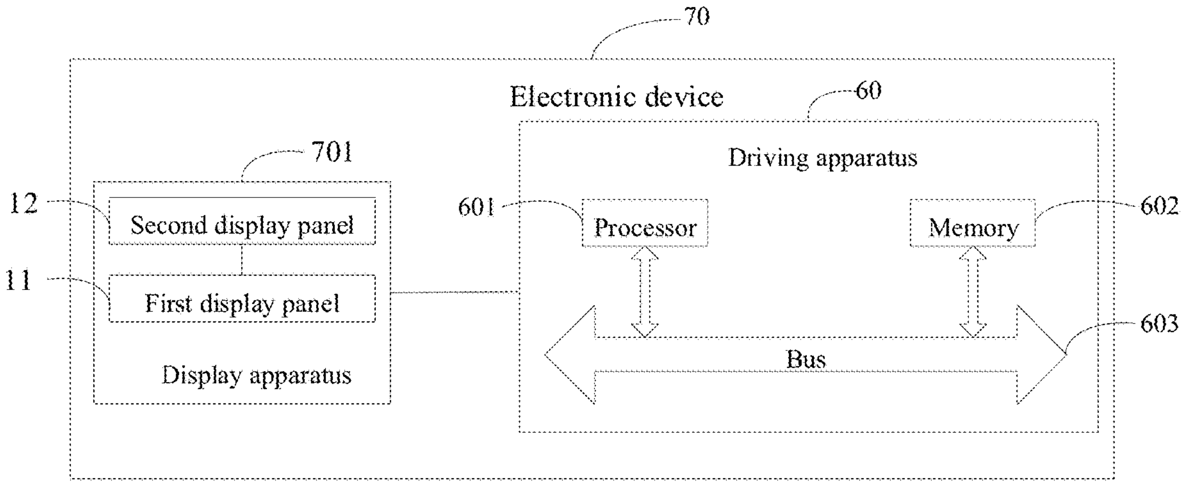
FIG. 7 is a schematic diagram of a structure of an electronic device according to an embodiment of the present disclosure.

An embodiment of the present disclosure further provides an electronic device. FIG. 7 is a schematic diagram of a structure of an electronic device according to an embodiment of the present disclosure. As shown in FIG. 7, the electronic device 70 may include a display apparatus 701 and the driving apparatus 60 in the above embodiment. The display apparatus 701 may include a first display panel 11 and a second display panel 12 disposed on a light-emitting side of the first display panel 11, and the first display panel 11 is divided into a plurality of pixel blocks.

Figure 8A:
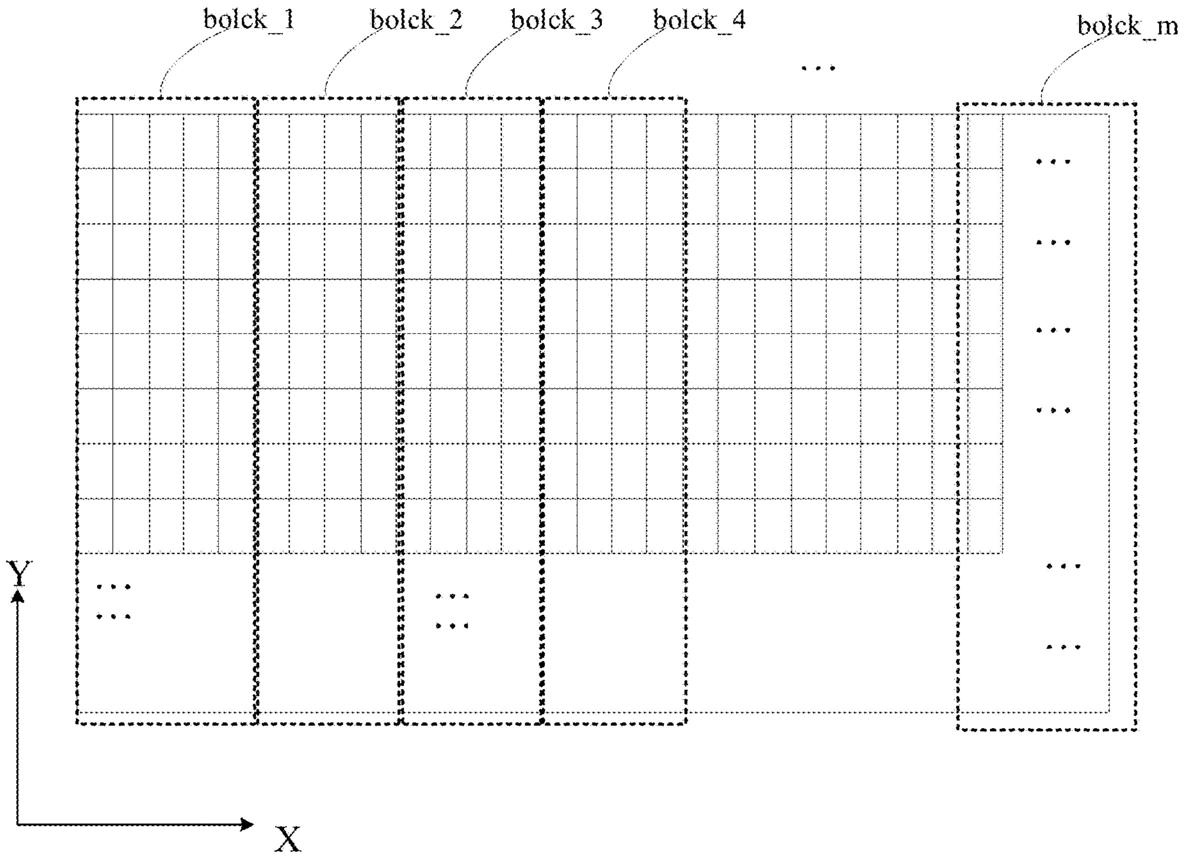
FIG. 8A is a schematic diagram of an arrangement pattern of a plurality of pixel blocks in a first display panel according to an embodiment of the present disclosure.
Figure 8B:
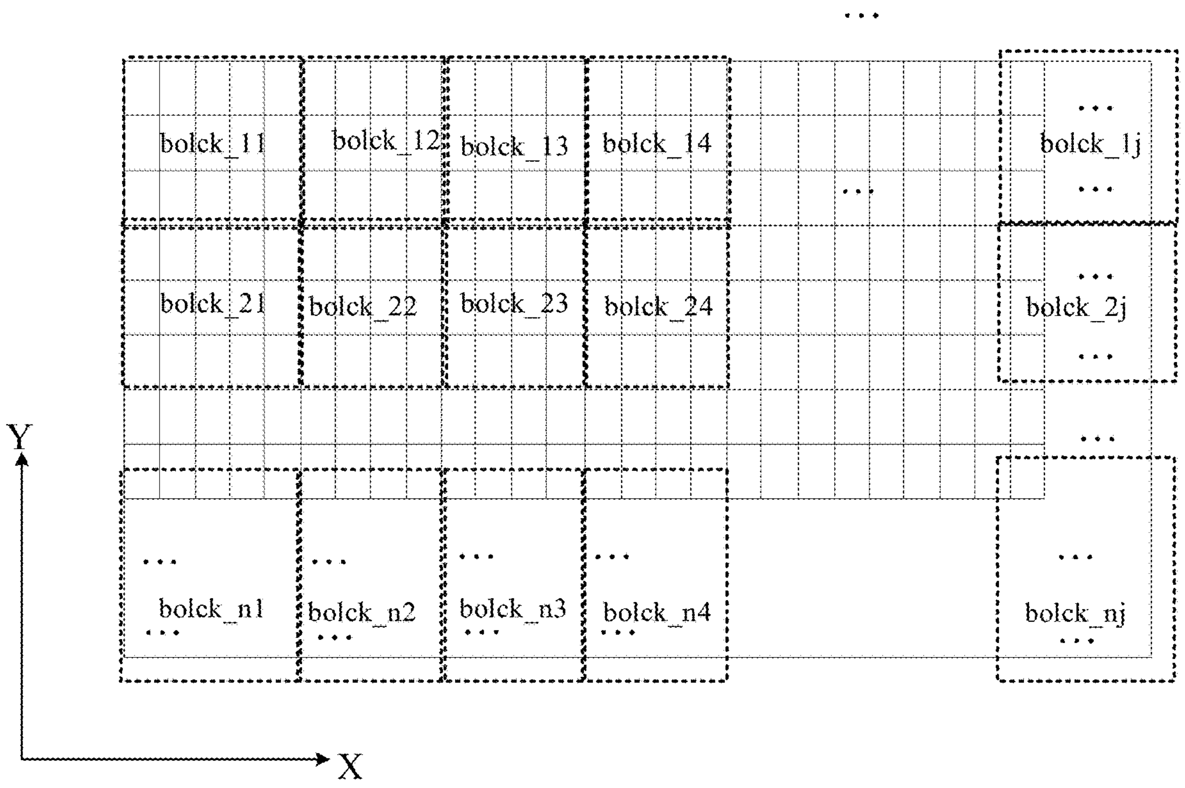
FIG. 8B is a schematic diagram of another arrangement pattern of a plurality of pixel blocks in a first display panel according to an embodiment of the present disclosure.

In an exemplary embodiment, the sizes and arrangement patterns of a plurality of pixel blocks may be set flexibly. For example, the sizes of a plurality of pixel blocks may be the identical or different. For example, as shown in FIG. 8A, a plurality of pixel blocks may be sequentially disposed along a first direction X. For example, as shown in FIG. 8B, a plurality of pixel blocks may be arrayed along a first direction X and a second direction Y, wherein the first direction intersects with the second direction.

Figure 9:
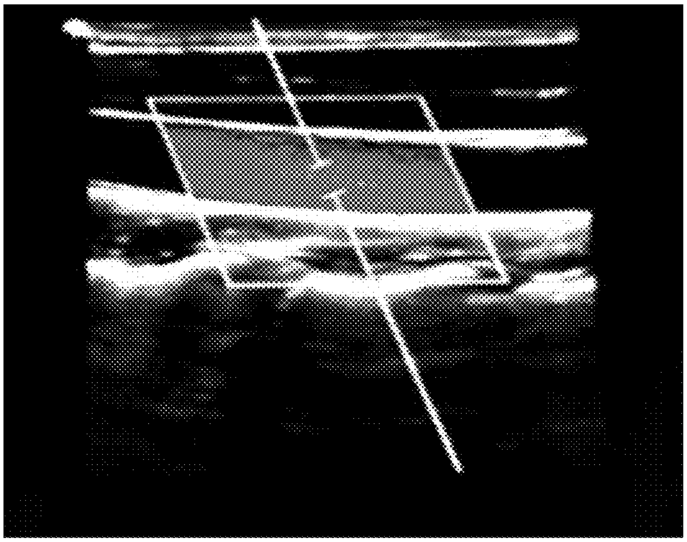
FIG. 9 is a schematic diagram of a display effect when an electronic device according to the embodiment of the present disclosure is an ultrasonic display device.

In an exemplary embodiment, the electronic device provided in the embodiment of the present disclosure may be a device for displaying ultrasonic images. For example, it may be applied to the medical field as a medical ultrasonic device, which can be used by a single doctor for consultation. The doctor's eyes can thereby be directly tracked by the eye tracking technology, and the angle between the user's eye and the first display panel may be obtained, and thus, the misalignment information corresponding to different pixel blocks may be determined according to the angles between the user's eye and different pixel blocks. Then, according to the misalignment information corresponding to different pixel blocks, the initial brightness data corresponding to different pixel blocks are independently corrected, so that the corrected brightness data can improve the pixel misalignment problem, thus improve the ghosting problem, as well as the display effect to enhance the user's visual experience. For example, as shown in FIG. 9, when the electronic device provided in this embodiment of the disclosure is applied to the medical field, images can be normally displayed, and the ghosting effect caused by physical misalignment can be eliminated.

In an exemplary embodiment, the display apparatus provided by the embodiment of the present disclosure may be a liquid crystal display apparatus or other device with a display function.

In an exemplary embodiment, the first display panel may be a light control liquid crystal panel or other types of panels with a light control function, such as an electronic ink panel or an electro chromic panel.

In an exemplary embodiment, the second display panel may be a liquid crystal display panel.

In an exemplary embodiment, taking the display apparatus as a liquid crystal display apparatus as an example, the first display panel is disposed on a light-emitting side of a backlight module and the second display panel is disposed on the light-emitting side of the first display panel, the brightness of backlight provided to the second display panel may be controlled in different regions by the first display panel disposed between the second display panel and the backlight module. For example, taking the first display panel as a light control liquid crystal panel as an example, the brightness of the backlight provided to the liquid crystal display panel may be regulated by regulating deflection angles of liquid crystal molecules in a liquid crystal layer of the second display panel. For example, the brightness of the backlight provided to a part of the liquid crystal display panel corresponding to a dark state region of the display image may be reduced by regulating the deflection angles of liquid crystal molecules in the second display panel, so as to reduce transmitted light intensity of the dark state region of a display image, thereby avoiding or weakening the dark state light leakage phenomenon of the liquid crystal display apparatus.

In an exemplary embodiment, the second display panel and the first display panel may have the same appearance size and functional size. For example, the second display panel and the first display panel have the same shape and size, a display region in the second display panel and a light control region in the first display panel have the same shape and size, so that after the second display panel and the first display panel are aligned and bonded, the light control region may correspond to the display region, thereby the backlight emitted by the backlight module after the backlight is regulated in the light control region is provided to the display region. For example, the display region in the second display panel includes a plurality of display pixels; the light control region in the first display panel includes a plurality of light control pixels.

In an exemplary embodiment, the first display panel may be a black-and-white liquid crystal display panel without a color filter. Alternatively, the first display panel may be a white organic electroluminescent display panel.

Figure 10:
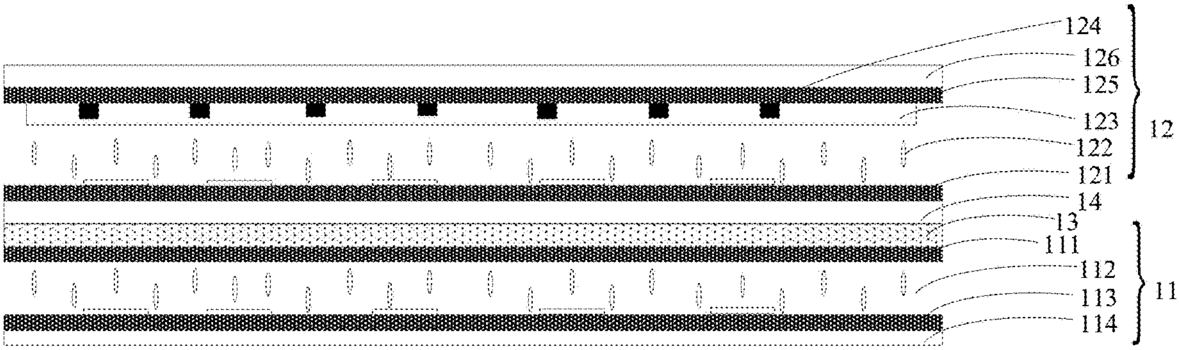
FIG. 10 is a schematic diagram of another structure of a display apparatus according to an embodiment of the present disclosure.

In an exemplary embodiment, as shown in FIG. 10, the second display panel 12 may include a first substrate 121, a first liquid crystal layer 122, a color filter layer 123, a black matrix layer 124, a second substrate 125 and an upper polarizer 126.

The first liquid crystal layer 122 is disposed on a side of the first substrate 121 away from the first display panel 11.

The color filter layer 123 is disposed on a side of the first liquid crystal layer 122 away from the first substrate 121.

The black matrix layer 124 is disposed in the color filter layers 123 and is disposed on the same layer as the color filter layers 123.

The second substrate 125 is disposed on a side of the color filter layers 123 away from the first liquid crystal layer 122.

The upper polarizer 126 is disposed on a side of the second substrate 125 away from the color filter layers 123.

In an exemplary embodiment, as shown in FIG. 10, the first display panel 11 may include a third substrate 111, a second liquid crystal layer 112, a fourth substrate 113 and a lower polarizer 114.

The second liquid crystal layer 112 is disposed on a side of the third substrate 111 away from the second display panel 12.

The fourth substrate 113 is disposed on a side of the second liquid crystal layer 112 away from the third substrate 111.

The lower polarizer 114 is disposed on a side of the fourth substrate 113 away from the second liquid crystal layer 112.

In an exemplary embodiment, the display apparatus may further include an adhesive layer 13 and an intermediate polarizer 14.

The adhesive layer 13 is disposed on a side of the third substrate 111 close to the second display panel 12.

The intermediate polarizer 14 is disposed on a side of the adhesive layer 13 away from the third substrate 111.

In an exemplary embodiment, the second display panel and the first display panel are adhered together by an intermediate adhesive layer, and three polarizers (i.e., an upper polarizer, an intermediate polarizer and a lower polarizer) are disposed in the display apparatus.

In addition, the above display apparatus may also include other structures or film layers. For example, the display apparatus may further include a backlight module, which is disposed on a backlight side of the first display panel (i.e., the side of the first display panel away from the second display panel). For example, the second display panel may include various components for display such as gate lines, data lines, pixel electrodes, common electrodes. Similarly, the first display panel may include various components for realizing light control, such as gate lines, data lines, pixel electrodes, and common electrodes. The embodiments of the present disclosure are not limited here.

In an exemplary embodiment, a display apparatus may be any product or component with a display function such as a mobile phone, a tablet computer, a television, a display, a laptop computer, a digital photo frame, a navigator, an apparatus for displaying ultrasonic images etc. Other essential components included by the display apparatus which should be understood by those of ordinary skill in the art will not be described repeatedly herein, and should not be taken as a limitation to the present disclosure.

The above description of the embodiments of the driving apparatus, the computer readable storage medium or the electronic device is similar to the description of the above description of method embodiments, and has similar advantages. For the technical details not disclosed in the embodiments of the driving apparatus, the computer readable storage medium or the electronic device of the present disclosure, please refer to the description of the method embodiments of the method, which will not be described here repeatedly.

It can be understood by those of ordinary skill in the art that all or some acts in the method disclosed above and function modules/units in the system and the device may be implemented as software, firmware, hardware, and proper combinations thereof. In a hardware implementation, division of the function modules/units mentioned in the above description is not always division corresponding to physical components. For example, a physical component may have a plurality of functions, or a plurality of physical components may cooperate to execute a function or act. Some components or all components may be implemented as software executed by a processor such as a digital signal processor or a microprocessor, or implemented as hardware, or implemented as integrated circuits such as application specific integrated circuits. Such software may be distributed in a computer-readable medium, and the computer-readable medium may include a computer storage medium (or a non-transitory medium) and a communication medium (or a temporary medium). As known to those of ordinary skill in the art, term computer storage medium includes volatile/nonvolatile and removable/irremovable media implemented in any method or technology for storing information (for example, a computer-readable instruction, a data structure, a program module, or other data). The computer storage medium includes, but is not limited to, a Random Access Memory (RAM), Read Only Memory (ROM), EEPROM, Flash RAM or other memory technologies, CD-ROM, digital versatile disk (DVD) or other optical disk storages, a magnetic box, magnetic tape, magnetic disk storage or other magnetic storage devices, or any other media that may be used to store desired information and may be accessed by computers. In addition, it is known to those of ordinary skill in the art that the communication medium usually includes a computer-readable instruction, a data structure, a program module or other data in a modulated data signal of, for example, a carrier or another transmission mechanism, and may include any information transmission medium.

Although the embodiments disclosed in the present disclosure are described as above, the contents described are merely embodiments used to facilitate understanding of the present disclosure and are not used to limit the present disclosure. Any person skilled in the art to which the present disclosure pertains may make any modifications and variations in the form and details of implementations without departing from the spirit and the scope of the present disclosure, but the protection scope of the present disclosure shall still be subject to the scope defined in the appended claims.

I claim:

1. A driving method of a display apparatus, wherein the display apparatus comprises a first display panel and a second display panel disposed on a light-emitting side of the first display panel, and the first display panel is divided into a plurality of pixel blocks each pixel block comprises a plurality of pixels;

the driving method comprises:

acquiring an angle between a user's eye and each pixel block of the plurality of pixel blocks and initial brightness data corresponding to the first display panel;

determining misalignment information corresponding to each pixel block according to the angle between the user's eye and each pixel block;

correcting the initial brightness data according to the misalignment information corresponding to each pixel block to obtain corrected brightness data; and outputting the corrected brightness data to the first display panel, wherein acquiring the angle between the user's eye and each pixel block comprises:

acquiring a distance between the user's eye and the first display panel and a distance between the user's eye and each pixel block; and determining the angle between the user's eye and each pixel block according to the distance between the user's eye and the first display panel and the distance between the user's eye and each pixel block, wherein acquiring the distance between the user's eye and the first display panel and the distance between the user's eye and each pixel block comprises:

acquiring three-dimensional coordinate information of the user's eye;

calculating a distance between the user's eye and a center point of the first display panel as the distance between the user's eye and the first display panel according to the three-dimensional coordinate information of the user's eye and three-dimensional coordinate information of the center point of the first display panel; and calculating a distance between the user's eye and a center point of each pixel block as the distance between the user's eye and each pixel block according to the three-dimensional coordinate information of the user's eye and three-dimensional coordinate information of the center point of each pixel block, wherein acquiring the three-dimensional coordinate information of the user's eye comprises:

acquiring a first image and a second image of the user's eye by images shot with a binocular camera;

according to a pixel position of the user's eye in the first image and a pixel position of the user's eye in the second image, converting the pixel position of the user's eye in the first image into a first spherical coordinate system position of the user's eye, and converting the pixel position of the user's eye in the second image into a second spherical coordinate system position of the user's eye;

converting the spherical coordinate system positions of the user's eye into three-dimensional coordinates of a three-dimensional space by combining a position information of the binocular camera; and obtaining the three-dimensional coordinate information of the user's eye according to the three-dimensional coordinates of the three-dimensional space, wherein correcting the initial brightness data according to the misalignment information corresponding to each pixel block to obtain corrected brightness data comprises:

calculating pixel misalignment information corresponding to each pixel block according to the misalignment information corresponding to each pixel block and size information of a single pixel in the first display panel, wherein according to the following formula (4), the pixel misalignment information corresponding to each pixel block is calculated according to the misalignment information corresponding to each pixel block and the size information of the single pixel in the first display panel, $$b_{i\_p}=S\_\text{pixel}/b_i \qquad \text{Formula (4)}$$

where, $b_i$ represents misalignment information corresponding to an i-th pixel block, S_pixel represents the size information of the single pixel in the first display panel, and $b_{i\_p}$ represents the pixel misalignment information corresponding to each pixel block.

2. The driving method of claim 1, wherein correcting the initial brightness data according to the misalignment information corresponding to each pixel block to obtain corrected brightness data comprises:

for each pixel block, obtaining the corrected brightness data corresponding to each pixel block according to the misalignment information corresponding to each pixel block, wherein obtaining the corrected brightness data corresponding to each pixel block according to the misalignment information corresponding to each pixel block comprises:

acquiring position information of the pixel block;

determining target position information corresponding to the pixel block according to the position information of the pixel block and the misalignment information corresponding to the pixel block; and acquiring brightness data corresponding to the target position information corresponding to the pixel block in the initial brightness data as the corrected brightness data corresponding to the pixel block.

3. The driving method of claim 2, wherein determining the target position information corresponding to the pixel block according to the position information of the pixel block and the misalignment information corresponding to the pixel block comprises:

determining whether the misalignment information corresponding to the pixel block is greater than a preset threshold;

if the misalignment information corresponding to the pixel block is greater than the preset threshold, determining the target position information corresponding to the pixel block according to the position information of the pixel block and the misalignment information corresponding to the pixel block; and if the misalignment information corresponding to the pixel block is not greater than the preset threshold, using the position information of the pixel block as the target position information corresponding to the pixel block.

4. The driving method of claim 1, wherein correcting the initial brightness data according to the misalignment information corresponding to each pixel block to obtain corrected brightness data further comprises:

for each pixel block, obtaining the corrected brightness data corresponding to each pixel block according to the pixel misalignment information corresponding to each pixel block, wherein obtaining the corrected brightness data corresponding to each pixel block according to the misalignment information corresponding to each pixel block comprises:

acquiring position information of each pixel in the pixel block;

determining sub-target position information corresponding to each pixel in the pixel block according to the position information of each pixel in the pixel block and the pixel misalignment information corresponding to the pixel block; and acquiring a sub-brightness value corresponding to the sub-target position information corresponding to each pixel in the pixel block in the initial brightness data as a corrected sub-brightness value corresponding to each pixel in the pixel block.

5. The driving method of claim 1, wherein determining the angle between the user's eye and each pixel block according to the distance between the user's eye and the first display panel and the distance between the user's eye and each pixel block comprises:

calculating a ratio between the distance between the user's eye and the first display panel and the distance between the user's eye and each pixel block to obtain a cosine value of the angle between the user's eye and each pixel block; and calculating the angle between the user's eye and each pixel block according to the cosine value of the angle between the user's eye and each pixel block by using an inverse cosine function.

6. A non-transitory computer-readable storage medium comprising a stored program, wherein a device in which the non-transitory storage medium is located is controlled to execute a driving method of a display apparatus when the program runs; wherein, the display apparatus comprises: a first display panel and a second display panel disposed on a light-emitting side of the first display panel, and the first display panel is divided into a plurality of pixel blocks, each pixel block comprises a plurality of pixels; the driving method comprises:

acquiring an angle between a user's eye and each pixel block of the plurality of pixel blocks and initial brightness data corresponding to the first display panel;

determining misalignment information corresponding to each pixel block according to the angle between the user's eye and each pixel block;

correcting the initial brightness data according to the misalignment information corresponding to each pixel block to obtain corrected brightness data; and outputting the corrected brightness data to the first display panel, wherein acquiring the angle between the user's eye and each pixel block comprises:

acquiring a distance between the user's eye and the first display panel and a distance between the user's eye and each pixel block; and determining the angle between the user's eye and each pixel block according to the distance between the user's eye and the first display panel and the distance between the user's eye and each pixel block, wherein acquiring the distance between the user's eye and the first display panel and the distance between the user's eye and each pixel block comprises:

acquiring three-dimensional coordinate information of the user's eye;

calculating a distance between the user's eye and a center point of the first display panel as the distance between the user's eye and the first display panel according to the three-dimensional coordinate information of the user's eye and three-dimensional coordinate information of the center point of the first display panel; and calculating a distance between the user's eye and a center point of each pixel block as the distance between the user's eye and each pixel block according to the three-dimensional coordinate information of the user's eye and three-dimensional coordinate information of the center point of each pixel block, wherein acquiring the three-dimensional coordinate information of the user's eye comprises:

acquiring a first image and a second image of the user's eye by images shot with a binocular camera;

according to a pixel position of the user's eye in the first image and a pixel position of the user's eye in the second image, converting the pixel position of the user's eye in the first image into a first spherical coordinate system position of the user's eye, and converting the pixel position of the user's eye in the second image into a second spherical coordinate system position of the user's eye;

converting the spherical coordinate system positions of the user's eye into three-dimensional coordinates of a three-dimensional space by combining a position information of the binocular camera; and obtaining the three-dimensional coordinate information of the user's eye according to the three-dimensional coordinates of the three-dimensional space, wherein correcting the initial brightness data according to the misalignment information corresponding to each pixel block to obtain corrected brightness data comprises:

calculating pixel misalignment information corresponding to each pixel block according to the misalignment information corresponding to each pixel block and size information of a single pixel in the first display panel, wherein according to the following formula (4), the pixel misalignment information corresponding to each pixel block is calculated according to the misalignment information corresponding to each pixel block and the size information of the single pixel in the first display panel, $$b_{i\_p}=S\_\text{pixel}/b_i \qquad \text{Formula (4)}$$

where, $b_i$ represents misalignment information corresponding to an i-th pixel block, S_pixel represents the size information of the single pixel in the first display panel, and $b_{i\_p}$ represents the pixel misalignment information corresponding to each pixel block.

7. The non-transitory computer readable storage medium of claim 6, wherein correcting the initial brightness data according to the misalignment information corresponding to each pixel block to obtain corrected brightness data comprises:

for each pixel block, obtaining the corrected brightness data corresponding to each pixel block according to the misalignment information corresponding to each pixel block, wherein obtaining the corrected brightness data corresponding to each pixel block according to the misalignment information corresponding to each pixel block comprises:

acquiring position information of the pixel block;

determining target position information corresponding to the pixel block according to the position information of the pixel block and the misalignment information corresponding to the pixel block; and acquiring brightness data corresponding to the target position information corresponding to the pixel block in the initial brightness data as the corrected brightness data corresponding to the pixel block.

8. The non-transitory computer readable storage medium of claim 7, wherein determining the target position information corresponding to the pixel block according to the position information of the pixel block and the misalignment information corresponding to the pixel block comprises:

determining whether the misalignment information corresponding to the pixel block is greater than a preset threshold;

if the misalignment information corresponding to the pixel block is greater than the preset threshold, determining the target position information corresponding to the pixel block according to the position information of the pixel block and the misalignment information corresponding to the pixel block; and if the misalignment information corresponding to the pixel block is not greater than the preset threshold, using the position information of the pixel block as the target position information corresponding to the pixel block.

9. The non-transitory computer readable storage medium of claim 6, wherein correcting the initial brightness data according to the misalignment information corresponding to each pixel block to obtain corrected brightness data further comprises:

for each pixel block, obtaining the corrected brightness data corresponding to each pixel block according to the pixel misalignment information corresponding to each pixel block, wherein obtaining the corrected brightness data corresponding to each pixel block according to the pixel misalignment information corresponding to each pixel block comprises:

acquiring position information of each pixel in the pixel block;

determining sub-target position information corresponding to each pixel in the pixel block according to the position information of each pixel in the pixel block and the pixel misalignment information corresponding to the pixel block; and acquiring a sub-brightness value corresponding to the sub-target position information corresponding to each pixel in the pixel block in the initial brightness data as a corrected sub-brightness value corresponding to each pixel in the pixel block.

10. The non-transitory computer readable storage medium of claim 6, wherein determining the angle between the user's eye and each pixel block according to the distance between the user's eye and the first display panel and the distance between the user's eye and each pixel block comprises:

calculating a ratio between the distance between the user's eye and the first display panel and the distance between the user's eye and each pixel block to obtain a cosine value of the angle between the user's eye and each pixel block; and calculating the angle between the user's eye and each pixel block according to the cosine value of the angle between the user's eye and each pixel block by using an inverse cosine function.

11. A driving apparatus, configured to drive a display apparatus, wherein the display apparatus comprises a first display panel and a second display panel disposed on a light-emitting side of the first display panel, and the first display panel is divided into a plurality of pixel blocks, each pixel block comprises a plurality of pixels, the driving apparatus comprises a processor and a memory storing a computer program that is capable of running on the processor, wherein following acts are implemented when the processor executes the computer program:

acquiring an angle between a user's eye and each pixel block of the plurality of pixel blocks and initial brightness data corresponding to the first display panel;

determining misalignment information corresponding to each pixel block according to the angle between the user's eye and each pixel block;

correcting the initial brightness data according to the misalignment information corresponding to each pixel block to obtain corrected brightness data; and outputting the corrected brightness data to the first display panel, wherein acquiring the angle between the user's eye and each pixel block comprises:

acquiring a distance between the user's eye and the first display panel and a distance between the user's eye and each pixel block; and determining the angle between the user's eye and each pixel block according to the distance between the user's eye and the first display panel and the distance between the user's eye and each pixel block, wherein acquiring the distance between the user's eye and the first display panel and the distance between the user's eye and each pixel block comprises:

acquiring three-dimensional coordinate information of the user's eye;

calculating a distance between the user's eye and a center point of the first display panel as the distance between the user's eye and the first display panel according to the three-dimensional coordinate information of the user's eye and three-dimensional coordinate information of the center point of the first display panel; and calculating a distance between the user's eye and a center point of each pixel block as the distance between the user's eye and each pixel block according to the three-dimensional coordinate information of the user's eye and three-dimensional coordinate information of the center point of each pixel block, wherein acquiring the three-dimensional coordinate information of the user's eye comprises:

acquiring a first image and a second image of the user's eye by images shot with a binocular camera;

according to a pixel position of the user's eye in the first image and a pixel position of the user's eye in the second image, converting the pixel position of the user's eye in the first image into a first spherical coordinate system position of the user's eye, and converting the pixel position of the user's eye in the second image into a second spherical coordinate system position of the user's eye;

converting the spherical coordinate system positions of the user's eye into three-dimensional coordinates of a three-dimensional space by combining a position information of the binocular camera; and obtaining the three-dimensional coordinate information of the user's eye according to the three-dimensional coordinates of the three-dimensional space, wherein correcting the initial brightness data according to the misalignment information corresponding to each pixel block to obtain corrected brightness data comprises:

calculating pixel misalignment information corresponding to each pixel block according to the misalignment information corresponding to each pixel block and size information of a single pixel in the first display panel, wherein according to the following formula (4), the pixel misalignment information corresponding to each pixel block is calculated according to the misalignment information corresponding to each pixel block and the size information of the single pixel in the first display panel, $$b_{i\_p}=S\_\text{pixel}/b_i \qquad \text{Formula (4)}$$

where, $b_i$ represents misalignment information corresponding to an i-th pixel block, S_pixel represents the size information of the single pixel in the first display panel, and $b_{i\_p}$ represents the pixel misalignment information corresponding to each pixel block.

12. An electronic device, comprising the display apparatus and the driving apparatus of claim 11.

13. The electronic device of claim 12, wherein the electronic device is a device for displaying an ultrasonic image.

14. The electronic device of claim 12, wherein an arrangement pattern of the plurality of pixel blocks comprises an array arrangement along a first direction and a second direction, or a sequential arrangement along the first direction, wherein the first direction intersects with the second direction.

15. The driving method of claim 1, wherein determining the misalignment information corresponding to each pixel block according to the angle between the user's eye and each pixel block comprises:

acquiring a distance between the first display panel and the second display panel;

calculating a tangent value of the angle between the user's eye and each pixel block by using a tangent function; and multiplying the tangent value of the angle between the user's eye and each pixel block by the distance between the first display panel and the second display panel to calculate the misalignment information corresponding to each pixel block.

16. The non-transitory computer readable storage medium of claim 6, wherein determining the misalignment information corresponding to each pixel block according to the angle between the user's eye and each pixel block comprises:

acquiring a distance between the first display panel and the second display panel;

calculating a tangent value of the angle between the user's eye and each pixel block by using a tangent function; and multiplying the tangent value of the angle between the user's eye and each pixel block by the distance between the first display panel and the second display panel to calculate the misalignment information corresponding to each pixel block.

* * * * *